Figure 1:
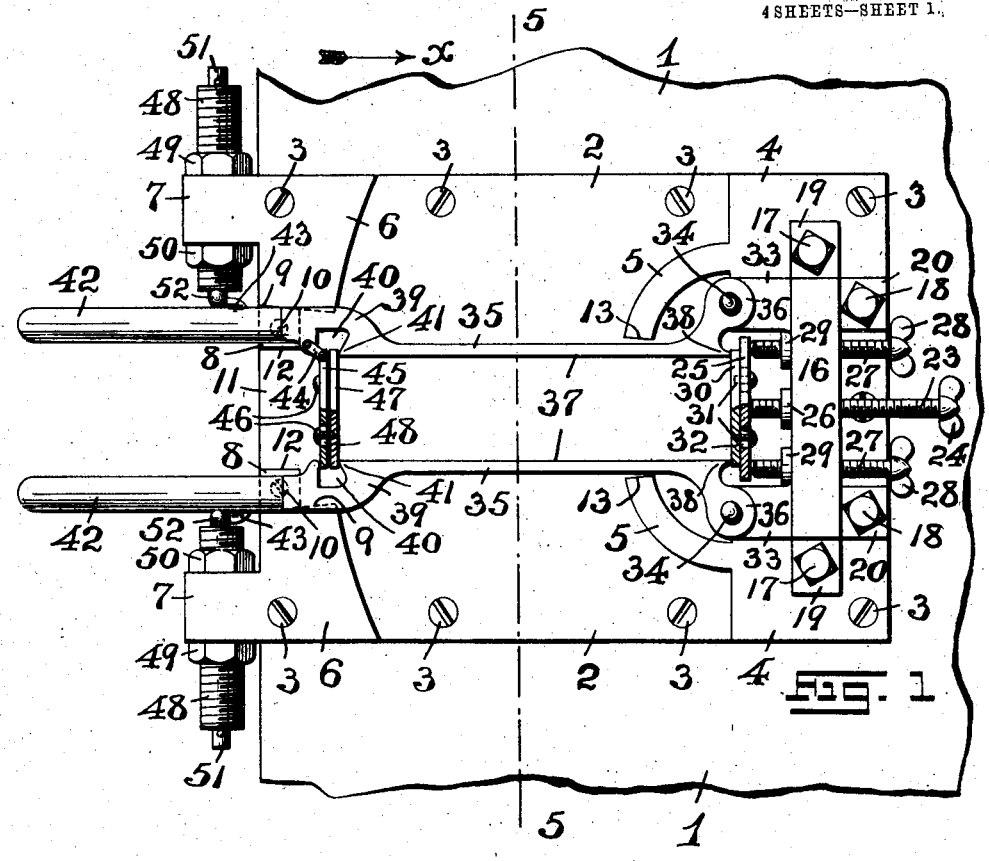

No. 834,617.　　　　　　　　　　　　　　　PATENTED OCT. 30, 1906.
J. P. HALL.
MOLDING DEVICE.
APPLICATION FILED OCT. 30, 1905.

4 SHEETS—SHEET 1.

WITNESSES:
Geo. D. Richards
Harry J. Horton

INVENTOR:
James P. Hall,
BY Fred'k. Fraentzel,
ATTORNEY

No. 834,617. PATENTED OCT. 30, 1906.
J. P. HALL.
MOLDING DEVICE.
APPLICATION FILED OCT. 30, 1905.
4 SHEETS—SHEET 2.
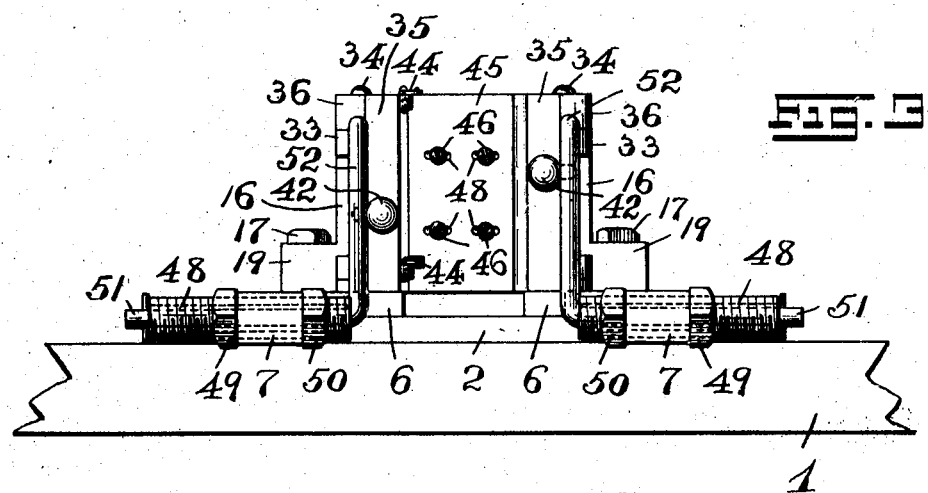
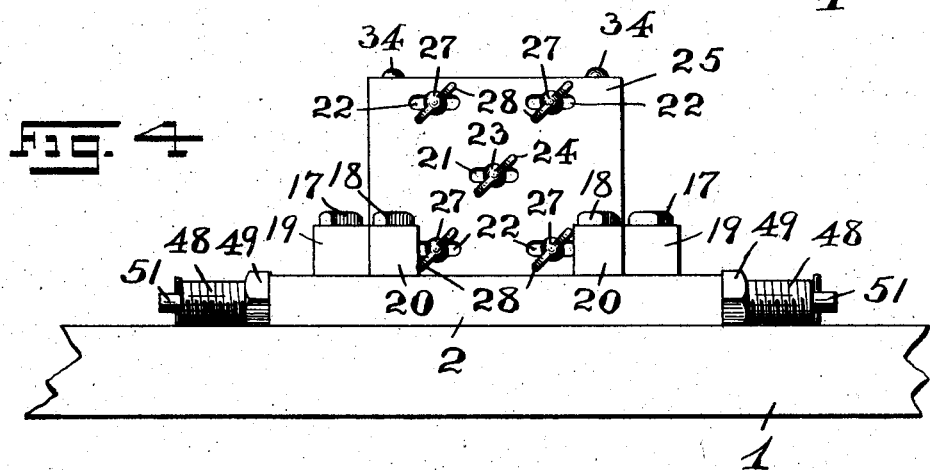
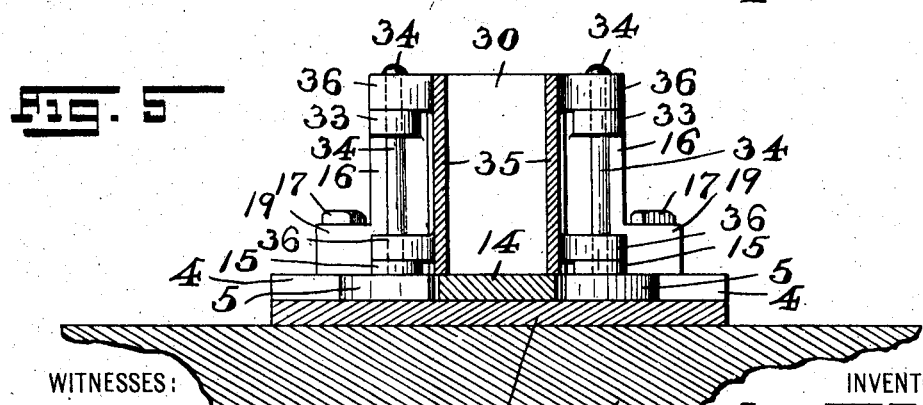
WITNESSES:
Geo. D. Richards
Harry S. Walter
INVENTOR:
James P. Hall,
BY Fred L. C. Fraentzel,
ATTORNEY

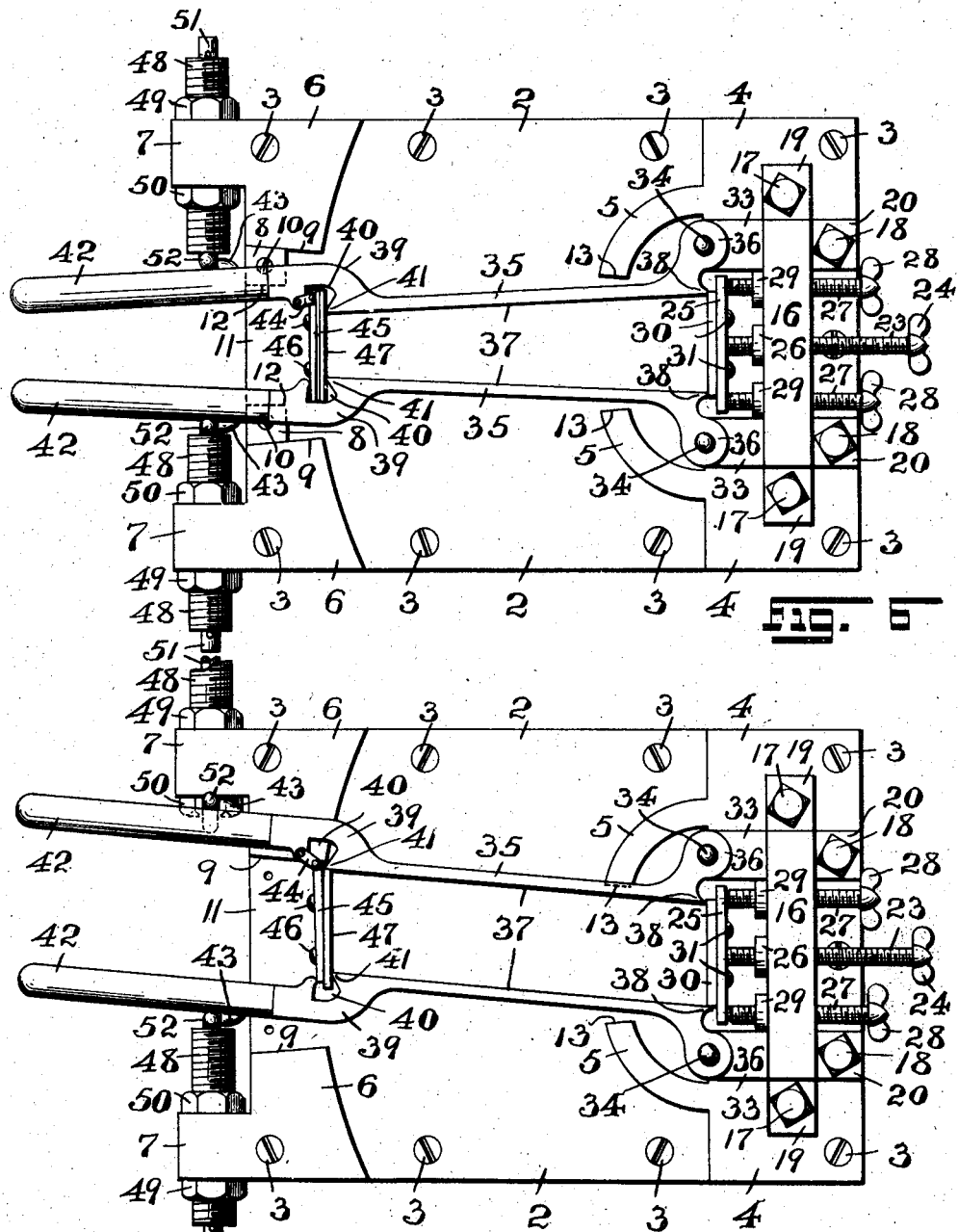

No. 834,617. PATENTED OCT. 30, 1906.
J. P. HALL.
MOLDING DEVICE.
APPLICATION FILED OCT. 30, 1905.
4 SHEETS—SHEET 4.
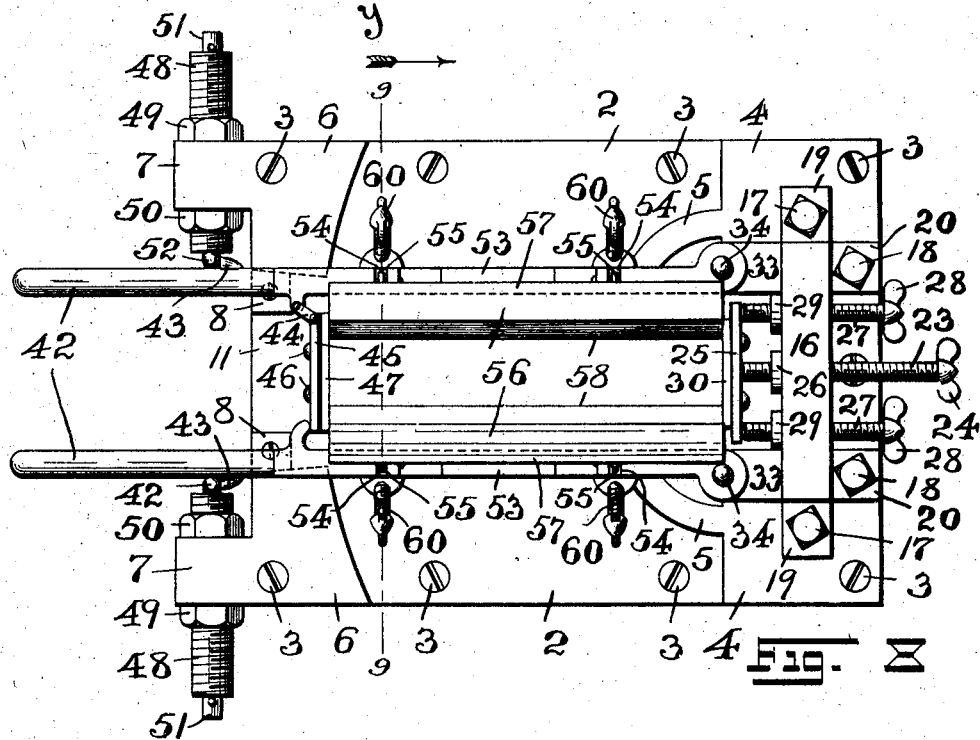
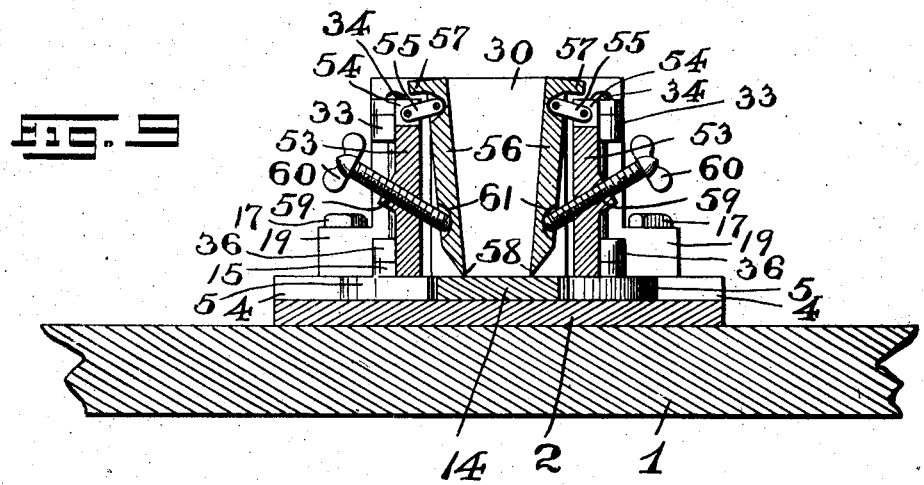
WITNESSES:
Geo. D. Richards
Harry G. _____
INVENTOR:
James P. Hall,
BY
Fred Lc. Fraentzel,
ATTORNEY
THE NORRIS PETERS CO., WASHINGTON, D. C.

UNITED STATES PATENT OFFICE.

JAMES P. HALL, OF JERSEY CITY, NEW JERSEY.

MOLDING DEVICE.

No. 834,617.  Specification of Letters Patent.  Patented Oct. 30, 1906.

Application filed October 30, 1905. Serial No. 284,962.

*To all whom it may concern:*

Be it known that I, JAMES P. HALL, a citizen of the United States, residing at Jersey City, in the county of Hudson and State of New Jersey, have invented certain new and useful Improvements in Molding Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My present invention has reference, generally, to improvements in molding devices; and this invention relates more particularly to a novel device or apparatus for the purposes of molding or forming plastic and other suitable materials or matter into the tapered shapes or forms of arch stones or bricks to be used in arches in the building arts, but which may also be used for molding stones or bricks with parallel sides in the geometrical forms of parallelogram, rectangle, or square.

The invention has for its principal objects to provide a simple, cheap, and efficiently-constructed molding device which may be easily manipulated for forming upon a removable pallet stones or bricks of the various shapes and configurations above stated and which is more especially adapted for quickly producing arch stones or bricks of the correct shapes.

A further object of the present invention is to produce a molding device of the character hereinafter more fully specified having adjustable side plates between which the plastic or green material is tamped into shape, and which sides are movable away from the faces of the molded material, so as to avoid any pulling away of the material.

Other objects of this invention not at this time more particularly mentioned will be clearly understood from the following detailed description of the said invention.

With the various objects of my present invention in view the said invention consists in the novel molding device or apparatus hereinafter set forth; and, furthermore, this invention consists in the various arrangements and combinations of devices and parts, as well as in the details of the construction of the same, all of which will be hereinafter more fully described and then finally embodied in the clauses of the claim, which are appended to and which form an essential part of the said specification.

The invention is clearly illustrated in the accompanying drawings, in which—

Figure 2:
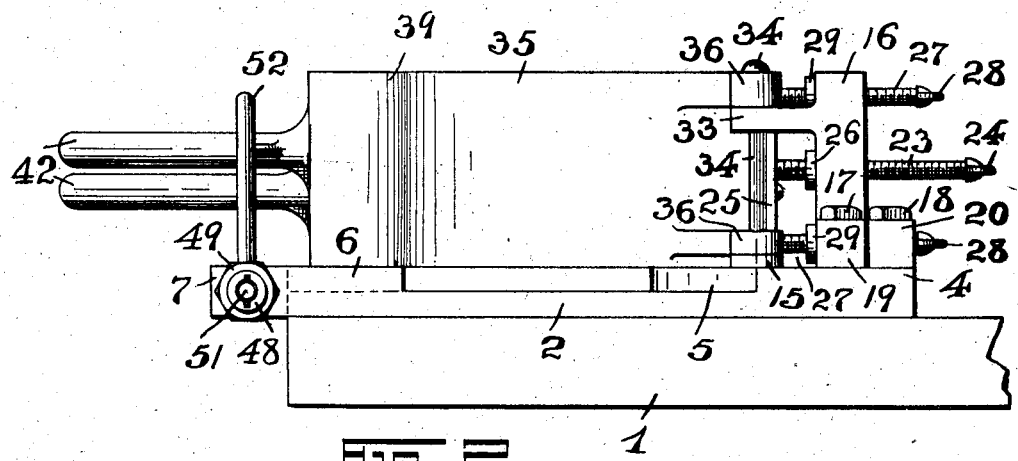

Figure 1 is a plan or top view of a molding device embodying the principles of my invention, showing the movable side walls of the device in their normally parallel relation for molding a stone or brick, of a rectangular configuration; and Fig. 2 is a side view of the same. Fig. 3 is a front end view, and Fig. 4 a rear end view, of the said molding device or apparatus; and Fig. 5 is a transverse section of the same, said section being taken on line 5 5 in said Fig. 1 looking in the direction of the arrow X. Figs. 6 and 7 are two plan or top views of the device, illustrating two applications of the device for molding a tapered or arch stone or brick and a stone or brick the configuration of which is a parallelogram or for producing a camber-arch stone or brick. Fig. 8 is a plan or top view, and Fig. 9 a transverse section, taken on line 9 9 in said Fig. 8 looking in the direction of the arrow Y, of a modified form of molding device or apparatus for the molding of stones or bricks having end faces which are alike in width and height, but for producing a stone or brick the longitudinal sides of which taper downwardly, so as to produce a stone or brick having a wide top and narrow bottom and the ends of the brick being alike and forming trapezoids.

Similar characters of reference are employed in all of the said above-described views to indicate corresponding parts.

The device or appliance hereinafter more particularly specified may be used for molding rectangular or square stones or bricks, or it may be used for the molding of arch stones or bricks, such as are used in the various arches, and especially in the semicircular, segment, flat, and cambered arches.

Referring now to Figs. 1 to 7, inclusive, the reference character 1 indicates any usual bench, table, or the like, upon which the molding device or apparatus embodying the principles of my present invention is to be arranged. Said molding device consists, essentially, of a main bed or plate 2, which may be provided with holes for the reception of screws 3 or the like for fastening the said bed or plate in position on the said table or bench 1. At its rear end the said bed or plate 2 is made with raised portions 4, extending laterally across the end of the bed or plate, each portion 4 being also formed with an arc-shaped or other suitably-shaped part 5, as shown, while at its forward end the said plate or bed 2 is made with suitably-raised corner portions 6, each portion 6 being provided with a forwardly-extending receiving lug or ear 7. All of these raised portions are preferably cast integral with the main body of the said plate or bed 2. Guide-blocks 8 are preferably detachably secured along the marginal edges 9 of the raised corner portions 6 by means of screws 10 or other suitable fastening means in the space 11 between the said corner portions, substantially as shown in Figs. 1 and 6 of the drawings. The edges 12 of the respective blocks 8 are longitudinally in alinement with the marginal edges 13 of the respective arc-shaped parts 5, thus providing suitable guiding portions for the sliding into position and properly retaining in such position against accidental displacement upon the plate or bed 2 of a pallet 14 (shown in transverse section in Fig. 5) and upon which a brick or stone is to be molded, substantially in the manner to be presently described. Extending from the said raised portion 4 are a pair of pintle-receiving lugs or ears 15, (see Figs. 2 and 5,) and extending upwardly from the said raised portion 4 is a bracket or block 16. This bracket or block is secured upon the said raised portion 4, preferably by means of the screws 17 and 18, which are arranged in the perforated lugs or ears 19 and 20, respectively, of the said bracket or block 16 and have their screw-threaded end portions screwed into correspondingly-placed screw-holes in the said portion 4, as will be clearly understood. The said bracket or block 16 is also provided with a series of holes or openings 21 and 22, which may be elongated, as shown in Fig. 4 of the drawings. A central screw 23 extends through the central hole or opening 21, said screw 23 being provided at its one end with a head or thumb-piece 24, and having its other end connected in any usual manner with a slidably-arranged plate 25. A nut 26 is arranged upon that part of the screw-threaded portion of the screw 23 between the said plate 25 and the bracket or box 16. Other screws 27 are arranged in the holes or openings 22, said screws 27 being provided with heads or thumb-pieces 28 at their outer free ends and having their inner free ends in engagement with the face of the plate 25. A nut 29 is also arranged upon each screw 27 in the manner clearly shown. Ordinarily a second plate 30 is secured against the opposite face of the plate 25 by means of rivets, pins, or screws 31. That the said plate 30 may be capable of a slight lateral adjustment upon the face of the plate 25, the said rivets, screws, or pins 31 extend through laterally-elongated slots or openings 32 in the plate 25, as indicated in the sectional detail of these parts shown in Fig. 1 of the drawings. The said bracket or block 16 is also provided with forwardly-extending pivot-lugs or ears 33. Resting upon the lower lugs 15 and upon these pivot-lugs or ears 33 and pivotally connected therewith by means of a pintle 34 are the ears or lugs 36 of a pair of hinged or swinging plates 35. These said plates, as will be seen, are made in such a manner that their straight faces 37 will form the inner sides of a mold, said plates being provided with rearwardly-extending and vertically-disposed edge portions or members 38, which, when the said plates 35 are in the positions indicated in Fig. 1 or in their adjusted relation, (shown in Fig. 6 of the drawings,) are in close contact with the face of the plate 30, as will be clearly understood from an inspection of said figures. Each hinged or swinging plate 35 is also provided with an enlarged and outwardly-extending part 39, formed with a vertically-extending receiving portion 40 and the vertically-extending and sharp marginal edge portion 41. A handle or operating-arm 42 extends in a forward direction from each plate 35, each handle or arm 42 being preferably formed with a lug or projection 43, forming a stop, for the purposes to be presently set forth. That the free ends of said handles 42 will not meet when the said hinged or pivoted plates 35 are adjusted in a close relation, the said handles may be located at different heights with respect to each other. Pivotally connected with one of the said plates 35, in front of the receiving portion 40, by means of links 44 or the like, is a vertical plate 45, to which may be secured, by means of screws or rivets 46, another plate 47. That the said plate 47 may be capable of a slight lateral adjustment upon the face of the said plate 45, the said screws or rivets extend through laterally-elongated slots or openings 48 in the plate 45, as shown in Figs. 1 and 3 of the drawings.

From an inspection more particularly of Fig. 1 of the drawings it will be seen that the opposite edges of the two plates 45 and 47 can be made to extend into the vertically-disposed receiving portion 40 of the other swing-plate, with the face of the plate 47 resting against the sharp marginal edge portions 41 of the said plates 35. A pallet 14, hereinabove mentioned, having been placed upon the plate or table 2 and the parts having been arranged in the manner shown in said Fig. 1, a rectangular mold is the result, in which the material can be formed into a rectangular brick or stone. For various lengths of stones or bricks a suitable block of wood or the like (not shown in the drawings) may be placed in either end portion of the mold, as will be clearly evident. That the said pivoted plates 35 may be held against any outward movements during the act of tamping the plastic material in the mold thus formed, I have arranged in the receiving portion of each lug or ear 7 a sleeve 48. Each sleeve 48 is provided upon its outer cylindrical surface with a screw-thread, as shown, and is slidably arranged in the smooth bore of the respective lug or ear 7, the said sleeves thus being capable of lateral adjustment and being adapted to be secured in their adjusted positions by means of a pair of nuts 49 and 50 on said screw-threaded surface by screwing said nuts tightly against the opposite faces of the respective lugs or ears 7, substantially as shown. Rotatively arranged within the bore of each sleeve 48 is a rod 51, having a right-angled arm or lever 52, which after the proper adjustment of the sleeve 48 is turned upwardly and against the side of an arm 42 until brought in contact with the stop or projection 43 of such arm 42.

Now suppose it is desired to set the swing-plates 35 at such angles to provide a mold in which a tapered arch stone or brick may be formed. The operations for setting the several parts are as follows: The several screws 23 and 27 are screwed back a sufficient distance to permit of a rearward movement of the plates 25 and 30, which allows of the proper pivotal motions of the two plates 35 upon their pintles 34. At the same time a rearward movement of the vertical edge portions 38 is produced, the plates 45 and 47 accommodating themselves to the new angular positions of the plates 35, as clearly shown in Fig. 6 of the drawings. The levers 52 having been previously turned away from their engagement with the sides of the respective arms 42, the nuts 49 and 50 are sufficiently unscrewed and the sleeves brought into their newly and properly adjusted positions in their respective lugs or ears 7, after which the said levers 52 are again turned into their vertical engagement with the sides of the arms 42. The two plates 25 and 30 are then again tightly moved against the vertical edges 38 of the plates 35 by the proper manipulation of the screws 23 and 27 and then held in place by screwing the various nuts 26 and 29 against the side of the bracket or block 16. In this manner, the pallet 14 having been previously placed in its position upon the plate or base 2, a mold of the configuration shown in said Fig. 6 is the result. After the plastic material has been properly tamped in place the levers 52 are turned downwardly from their engagement with the sides of the arms 42, and by taking hold of these arms 42 the swing-plates 35 are moved away from the sides of the molded form of plastic material. The pallet, with its molded form of material, is then removed from the plate or bed 2, another pallet substituted in place of the removed pallet, and the parts of the apparatus again brought into position to provide another mold for the next molding operation. Shorter arch stones or bricks may be formed by placing in the mold at either end properly-shaped blocks of wood or the like, such blocks, however, not being shown in the accompanying drawings.

When the apparatus is to be used for the purpose of molding stones or bricks which are to be used in camber-arches, the blocks 8 are removed, so as to permit the placing in position of a pallet, the configuration of which is usually that of a parallelogram, and the swing-plates 35 and other parts are brought into their relatively adjusted positions. (Shown in Fig. 7 of the drawings.) In this case, the various vertical edge portions 38 and 41 assuming a somewhat-distorted relation to one another, a lateral adjustment of the respective plates 25 and 30 and 45 and 47 is necessary and is possible, owing to the arrangement of the screws or pins 31 and 46 in the elongated openings in the respective plates 25 and 45. Thus it is possible to produce an assembled relation of the several parts in a manner represented in said Fig. 7, and a mold is produced which has the general configuration of a parallelogram and in which may then be made stones or bricks for camber-arches precisely in the same manner as hereinabove described.

In Figs. 8 and 9 of the drawings I have shown a slightly-modified construction of molding device or apparatus which embodies the leading features of my present invention, but which may be used for the molding of stones or bricks which are narrower at the bottom than at the top and the respective ends of which are trapezoids with two parallel sides. In this construction of molding device I have substituted for the two swing-plates 35 two swing-plates 53, which are slotted, as at 54. Pivotal links 55 are arranged in said slotted portions 54, said links being also pivotally connected at their opposite ends with angularly-disposed plates 56. The upper edges of said plates 56 may be made with marginal extensions 57, which extend over the upper edges of said plates 53 to protect the parts of the plates 53 filling up with sand or the like, and the lower marginal edges of said plates 56 are preferably chisel-shaped, as at 58, so as to produce a positively closed engagement of said plates 56 with the upper face of the pallet, no matter what the adjustment of said plates 56. That the said plates 56 may be moved toward each other into an angular adjusted relation, as shown, the swing-plates 53 are provided with downwardly-inclining screw-threaded holes 59, in which are arranged the correspondingly-disposed screws 60, the lower free-end portions of said screws resting in rotative engagement in sockets or pockets 61, formed in the said inclined plates 56.

From an inspection more particularly of Fig. 9 of the drawings it will be seen that the angular position of each screw 60 is such that the plates 56 will always maintain a closed engagement of their chisel-shaped edges 58 with the pallet 14, and a perfect mold of the shape shown is the result. It will also be evident that by bringing the two swing-plates 53 in an angular relation to each other, similar to that shown and described in connection with Fig. 6, a stone or brick may be made which tapers in the length as well as in the depth of the stone or brick.

Having thus described my invention, what I claim is—

1. A molding device comprising a bed-plate having a pallet-receiving depression, raised portions on said bed-plate, side plates movably arranged upon said raised portions of the bed-plate, end plates located at the respective ends of said side plates, and means for moving said side plates laterally upon said raised portions of the bed-plate, substantially as and for the purposes set forth.

2. A molding device comprising a bed-plate having a pallet-receiving depression, raised portions on said bed-plate, side plates movably arranged upon said raised portions of the bed-plate, end plates located at the respective ends of said side plates, and means for moving said side plates laterally upon said raised portions of the bed-plate, and means connected with said bed-plate for preventing lateral movement of said side plates, substantially as and for the purposes set forth.

3. A molding device comprising a bed-plate having a pallet-receiving depression, raised portions on said bed-plate, side plates movably arranged upon said raised portions of the bed-plate, end plates located at the respective ends of said side plates, and arms extending from said side plates for moving said side plates laterally upon said raised portions of the bed-plate, substantially as and for the purposes set forth.

4. A molding device comprising a bed-plate having a pallet-receiving depression, raised portions on said bed-plate, side plates movably arranged upon said raised portions of the bed-plate, end plates located at the respective ends of said side plates, and arms extending from said side plates for moving said side plates laterally upon said raised portions of the bed-plate, and means connected with said bed-plate for engagement with said arms to prevent lateral movement of said side plates, substantially as and for the purposes set forth.

5. A molding device comprising a bed-plate having a pallet-receiving depression, side plates movably arranged upon said bed-plate, end plates located at the respective ends of said side plates, means for moving said side plates laterally upon said bed-plate, and means connected with said bed-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with each side plate, substantially as and for the purposes set forth.

6. A molding device comprising a bed-plate having a pallet-receiving depression, side plates movably arranged upon said bed-plate, end plates located at the respective ends of said side plates, arms extending from said side plates for moving said side plates laterally upon said base-plate, and means connected with said base-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with the side of an arm on each side plate, substantially as and for the purposes set forth.

7. A molding device comprising a bed-plate having a pallet-receiving depression, side plates movably arranged upon said bed-plate, end plates located at the respective ends of said side plates, arms extending from said side plates for moving said side plates laterally upon said base-plate, and means connected with said base-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with the side of an arm on each side plate, and a stop on each arm to limit the movement of each lever, substantially as and for the purposes set forth.

8. A molding device comprising a bed-plate having a pallet-receiving depression, hinge connections near one end of said bed-plate, side plates hinged at their rear ends to said hinge connections, end plates located at the respective ends of said side plates, and means for moving said side plates laterally upon said bed-plate, substantially as and for the purposes set forth.

9. A molding device comprising a bed-plate having a pallet-receiving depression, hinge connections near one end of said bed-plate, side plates hinged at their rear ends to said hinge connections, end plates located at the respective ends of said side plates, and means for moving said side plates laterally upon said bed-plate, and means connected with said bed-plate for preventing lateral movement of said side plates, substantially as and for the purposes set forth.

10. A molding device comprising a bed-plate having a pallet-receiving depression, hinge connections near one end of said bed-plate, side plates hinged at their rear ends to said hinge connections, end plates located at the respective ends of said side plates, and arms extending from said side plates for moving said side plates laterally upon said bed-plate, substantially as and for the purposes set forth.

11. A molding device comprising a bed-plate having a pallet-receiving depression, hinge connections on said bed-plate, side plates connected with said hinge connections, end plates located at the respective ends of said side plates, and arms extending from said side plates for moving said side plates laterally upon said bed-plate, and means connected with said bed-plate for engagement with said arms to prevent lateral movement of said side plates, substantially as and for the purposes set forth.

12. A molding device comprising a bed-plate having a pallet-receiving depression, hinge connections on said bed-plate, side plates connected with said hinge connections, end plates, located at the respective ends of said side plates, means for moving said side plates laterally upon said bed-plate, and means connected with said bed-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with each side plate, substantially as and for the purposes set forth.

13. A molding device comprising a bed-plate having a pallet-receiving depression, hinge connections on said bed-plate, side plates connected with said hinge connections, end plates located at the respective ends of said side plates, arms extending from said side plates for moving said side plates laterally upon said base-plate, and means connected with said base-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with the side of an arm on each side plate, substantially as and for the purposes set forth.

14. A molding device comprising a bed-plate having a pallet-receiving depression, hinge connections on said bed-plate, side plates connected with said hinge connections, end plates located at the respective ends of said side plates, arms extending from said side plates for moving said side plates laterally upon said base-plate, and means connected with said base-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with the side of an arm on each side plate, and a stop on each arm to limit the movement of each lever, substantially as and for the purposes set forth.

15. A molding device comprising a bed-plate having a pallet-receiving depression, side plates movably arranged upon said bed-plate, vertically-disposed sharp edge portions at the rear ends of said side plates and vertically-extending receiving portions at the opposite end portions of said side plates, adjustable end plates at the respective ends of said side plates, and means for moving said side plates laterally upon said bed-plate, substantially as and for the purposes set forth.

16. A molding device comprising a bed-plate having a pallet-receiving depression, side plates movably arranged upon said bed-plate, vertically-disposed sharp edge portions at the rear ends of said side plates and vertically-extending receiving portions at the opposite end portions of said side plates, adjustable end plates at the respective ends of said side plates, and means for moving said side plates laterally upon said bed-plate, and means connected with said bed-plate for preventing lateral movement of said side plates, substantially as and for the purposes set forth.

17. A molding device comprising a bed-plate having a pallet-receiving depression, side plates movably arranged upon said bed-plate, vertically-disposed sharp edge portions at the rear ends of said side plates and vertically-extending receiving portions at the opposite end portions of said side plates, adjustable end plates at the respective ends of said side plates, and arms extending from said side plates for moving said side plates laterally upon said bed-plate, substantially as and for the purposes set forth.

18. A molding device comprising a bed-plate having a pallet-receiving depression, side plates movably arranged upon said bed-plate, vertically-disposed sharp edge portions at the rear ends of said side plates and vertically-extending receiving portions at the opposite end portions of said side plates, adjustable end plates at the respective ends of said side plates, and arms extending from said side plates for moving said side plates laterally upon said bed-plate, and means connected with said bed-plate for engagement with said arms to prevent lateral movement of said side plates, substantially as and for the purposes set forth.

19. A molding device comprising a bed-plate having a pallet-receiving depression, side plates movably arranged upon said bed-plate, adjustable end plates at the respective ends of said side plates, means for moving said side plates laterally upon said bed-plate, and means connected with said bed-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with each side plate, substantially as and for the purposes set forth.

20. A molding device comprising a bed-plate having a pallet-receiving depression, side plates movably arranged upon said bed-plate, adjustable end plates at the respective ends of said side plates, arms extending from said side plates for moving said side plates laterally upon said base-plate, and means connected with said base-plate for preventing lateral movement of said side plates, consisting of tubular lugs on said bed-plate, screw-threaded sleeves slidably arranged in said lugs, nuts on said sleeves for retaining said sleeves in their adjusted positions in said lugs, an oscillatory rod in each sleeve, and a lever on each rod for engagement with the side of an arm on each side plate, substantially as and for the purposes set forth.

21. A molding device comprising a bed-plate having a pallet-receiving depression, side plates movably arranged upon said bed-plate, adjustable end plates at the respective ends of said side plates, arms extending from said side plates for moving said side plates laterally upon said base-plate, and means connected with said base-plate for preventing lateral movement of said side plates, consisting of tubular lugs on said bed-plates, screw-threaded sleeves slidably arranged in said lugs, nuts on said sleeves for retaining said sleeves in their adjusted positions in said lugs, an oscillatory rod in each sleeve, and a lever on each rod for engagement with the side of an arm on each side plate, and a stop on each arm to limit the movement of each lever, substantially as and for the purposes set forth.

22. In a molding device, a bed-plate having a raised end portion at one end, and arc-shaped members extending therefrom, said members forming a pallet-guide, substantially as and for the purposes set forth.

23. In a molding device, a bed-plate having a raised end portion at one end, and arc-shaped members extending therefrom, a pair of raised portions at the opposite end of said bed-plate, and blocks, said blocks and arc-shaped members forming pallet-guides, substantially as and for the purposes set forth.

24. In a molding device, a bed-plate having a raised end portion at one end, and arc-shaped members extending therefrom, a pair of raised portions at the opposite end of said bed-plate, a pair of hinged side plates movably arranged upon said raised portions, and end plates located at the opposite ends of said side plates, substantially as and for the purposes set forth.

25. In a molding device, a bed-plate having a raised end portion at one end, and arc-shaped members extending therefrom, a pair of raised portions at the opposite end of said bed-plate, a pair of hinged side plates movably arranged upon said raised portions, and end plates located at the opposite ends of said side plates, one of said end plates being pivotally connected with the forward end of one of the side plates and the other end plate having an adjustment longitudinally, substantially as and for the purposes set forth.

26. In a molding device, a pair of side plates having vertically-disposed recesses 40, and an end plate having its ends arranged in said recesses, and a hinge connection between said end plate and one of said side plates, substantially as and for the purposes set forth.

27. In a molding device, the combination, with a bed-plate, of a pair of hinged side plates, each side plate being provided with a sharp edge 38, a vertical recess 40 and a sharp edge 41, an adjustable end plate arranged against the edges 38 of said side plates, and another adjustable end plate arranged against the edges 41 of said side plates, substantially as and for the purposes set forth.

28. In a molding device, the combination, with a bed-plate, of a pair of hinged side plates, each side plate being provided with a sharp edge 38, a vertical recess 40, and a sharp edge 41, an adjustable end plate arranged against the edges 38 of said side plates, and another adjustable end plate arranged against the edges 41 of said side plates, each end plate comprising two plates, one of said plates being provided with elongated openings, and headed pins in said openings for adjustably connecting said plates, substantially as and for the purposes set forth.

29. In a molding device, the combination, with a bed-plate, of a pair of hinged side plates, forwardly-extending arms on said side plates, and oscillating levers on said bed-plate arranged for engagement with said arms to prevent the lateral movement of said side plates, substantially as and for the purposes set forth.

30. In a molding device, the combination, with a bed-plate, of a pair of side plates and end plates, and an angularly-disposed inner plate, hinged at its upper edge to the upper edge of each side plate, and a screw connected with each side plate having an end in engagement with an inner plate for angular adjustment of said inner plate, substantially as and for the purposes set forth.

In testimony that I claim the invention set forth above I have hereunto set my hand this 27th day of October, 1905.

JAMES P. HALL.

Witnesses:
 FREDK. C. FRAENTZEL,
 GEO. D. RICHARDS.